Patented June 10, 1924.

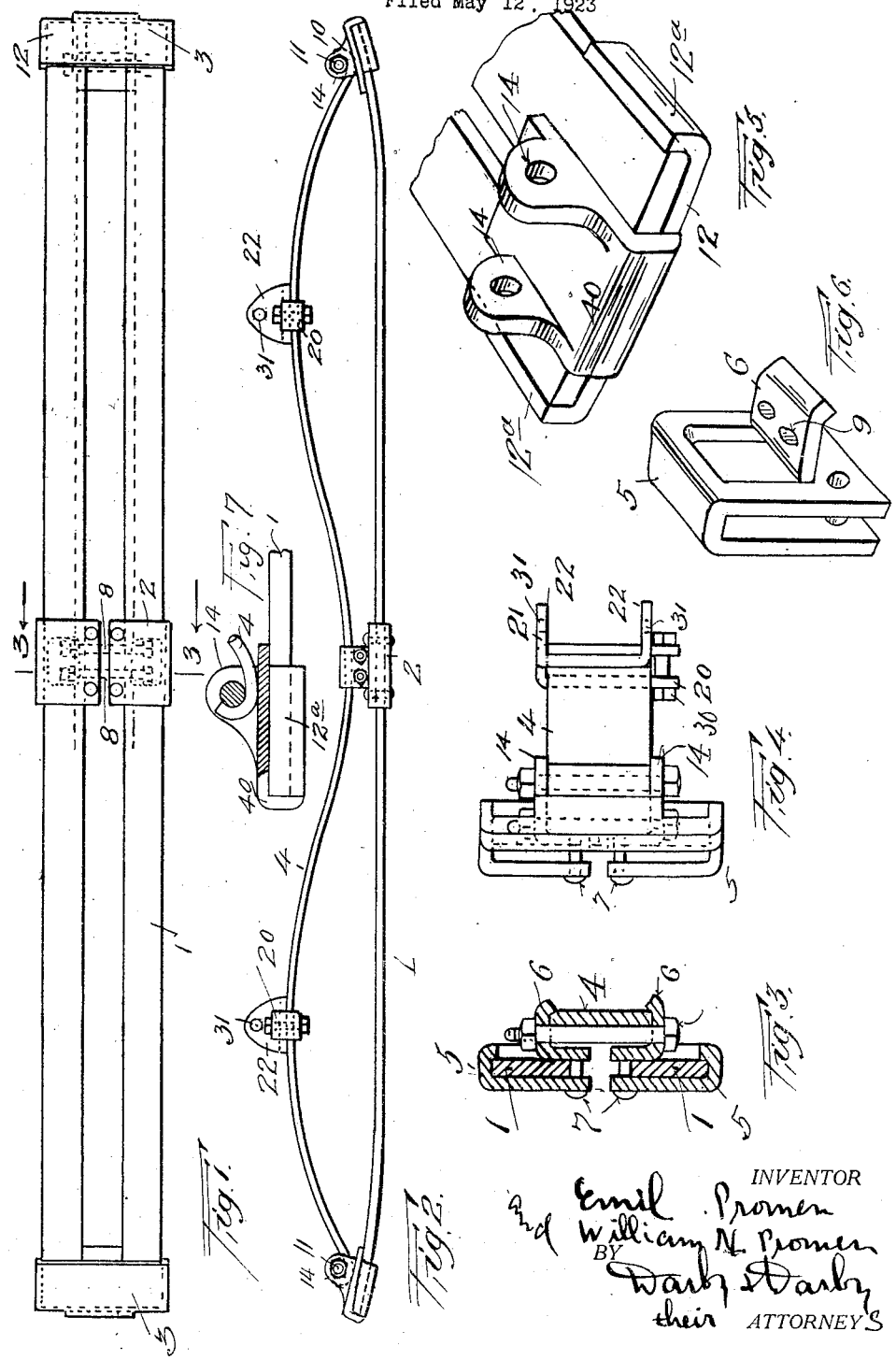

1,497,227

UNITED STATES PATENT OFFICE.

EMIL PROMEN AND WILLIAM N. PROMEN, OF DETROIT, MICHIGAN.

VEHICLE BUMPER.

Application filed May 12, 1923. Serial No. 638,439.

*To all whom it may concern:*

Be it known that we, EMIL PROMEN and WILLIAM N. PROMEN, citizens of the United States, residing at Detroit, in the county of Wayne, State of Michigan, have made a certain new and useful Invention in Vehicle Bumpers, of which the following is a specification.

This invention relates to vehicle bumpers and has for its object the provision of a bumper for use in connection with vehicles, such, for illustration, as automobiles, which is simple in structure, efficient in operation and economical of manufacture.

The object of the invention is to provide a bumper of novel and efficient design wherein, with but few parts, maximum resiliency and strength are obtained with an even distribution of the strain of impact distributed throughout the same.

A further object of the invention is to provide a bumper which will permit a complete compression thereof to a point where the rear bar truss can be stressed and elongated parallel to the front bar, but will as soon as pressure on the front bar is removed rebound to its original position.

Further objects of the invention will appear more fully hereinafter.

The invention consists substantially in the construction, combination, location and relative arrangement of parts, all as will be more fully hereinafter set forth, as shown in the accompanying drawing and finally pointed out in the appended claims.

Referring to the accompanying drawing:—

Fig. 1 is a view in front elevation of a bumper embodying our invention.

Fig. 2 is a top plan view of the same.

Fig. 3 is a sectional view taken on the line 3—3, Fig. 1, and looking in the direction of the arrows.

Fig. 4 is a view in side elevation showing the end retainer assembly employed in accordance with our invention.

Fig. 5 is a view in perspective of the end clamp.

Fig. 6 is a similar view of a portion of the center clamp.

Fig. 7 is a fragmentary view in plan, partially in section, showing the end of the bumper structure.

It is among the special purposes of our present invention to provide a bumper which will permit effecting a complete compression of the bumper to a point where the rear bar truss can be stressed and elongated parallel to the front bar and will, when compression on the front bar is removed, rebound to its original position. To accomplish this, we so construct the rear bar truss as to permit longitudinal traverse. This longitudinal traverse may be effected at any point on the rear bar truss to permit the same to assume the form of a straight bar or bars, as desired, under complete depression.

While we have shown and will now describe an arrangement which permits traverse at the approximate ends of the rear bar truss relative to the front bar, we do not desire to be limited or restricted in this respect, as it will be apparent to those skilled in the art with the knowledge acquired herefrom, that traverse of the rear bar relative to the front bar may be effected at any desired point.

Similarly, we do not desire to be limited or restricted to the particular means selected for illustration for effecting the longitudinal traverse of the rear bar truss relative to the front bar, as it will be apparent to those skilled in the art that this may be accomplished by various means.

Referring to the drawing, wherein as hereinbefore stated, we have selected a simple but efficient structure embodying the principles of our invention, reference character 1 designates the front bar or bars of the bumper structure and is provided with what we will term a center clamp assembly 2 located at the approximate center thereof and end retainer assemblies 3, which assemblies are employed for supporting the rear bar truss 4 which may consist of one or more individual bars. The rear bar truss construction is of double reverse sweep, as shown best in Fig. 2, in which the radii of the rearward sweep and the forward sweep are preferably identical or nearly so. This is preferable so as to effect equal fibre stresses at all points under impact. The center clamp assembly in the construction shown includes two clamps of identical construction but positioned inverted with respect to each other. This clamp, as shown in Fig. 6 and in the remainder of the figures, is designated by reference character 5. These clamps are utilized to fasten the rear bar truss to the front bars at the center of the bumper and consist of a metal strip formed in the shape of a U with a portion 6 of one wall thereof punched through at one end and bent out to an angle of approximately 90 degrees in the direction of the open end of the U. The extreme end of said portion 6 is still further bent to an angle of approximately thirty degrees. The two U shaped clamps are slipped over the front bars and held in place by rivets 7. In this position the rear bar 4 is slipped between the portions of the clamps 6 which are bent out, as above described, and, since there is no connection between the upper and lower clamps, by inserting one or more bolts 8 in the orifices 9 provided in the portions 6 of the clamps 5 and tightening the same, the rear bar truss is fastened securely at the center, thereby avoiding the possibility of shifting at the center in the case of impact at one end of the bumper only. While traverse movement of the rear bar truss may be desired relative to the center clamp of the front bar in some arrangements, in the arrangement selected for illustration of our invention we find it preferable to prevent shifting of the rear bar truss relative to the front bar at their centers, for if shifting at the center in this arrangement were permitted the forward sweep would not be stressed and due to its rotary traverse the force of the impact would be transmitted to the opposite rear sweep, resulting in much loss of resistance.

The ends of the rear bar truss are formed in half loops which are slidably held in the end retainer assemblies. The end retainer assembly which is clearly shown in Fig. 5, comprises a stamping 12 having a bent over portion 40 which provides a space between the body of the stamping and the under surface of the portion 40, as shown, whereby the ends of the front bars are positioned in said space and can be clamped therein. The portion 40 has two spaced lugs or ears 14 between which the rear bar truss is located as shown in Fig. 7. A bolt 11 extends between the ears or lugs 14 to form an anchor to cooperate with the half loops at the ends of the rear bar truss when in normal position. With this arrangement it will be seen that to position the bolts 11 in the end retainer assemblies, it is necessary to forcibly elongate the rear bar truss, for example by depressing the same out of its normal sweep.

This process of placing the rear bar truss under load is both novel and important and possesses many advantages. The process consists of so forming the rear bar truss that it must be forcibly bent to elongate it sufficiently to enable it to be assembled. By this means we obtain greater ultimate resistance with comparatively short span between the front bar and the rear bar truss, whereas with a rear bar truss that is not placed under load, the span between the front bar and the rear bar truss providing backward and forward movement, would necessarily have to be much greater to obtain the same ultimate resistance, as it will be understood that a spring in its first stages of compression offers comparatively little resistance. This superfluous movement is eliminated in our construction by the partial compression in assembly and enables us to reduce the span between the front bar and the rear bar truss.

It will be seen from the foregoing that we have supplied a bumper structure which permits longitudinal traverse of the ends of the rear bar truss relative to the front bar. This traverse is more pronounced at the ends of the truss and in the sense that it is not obstructed the traverse is unlimited. Of course, the degree of curvature of the rear truss limits the amount of traverse possible.

The hanger retainer assembly is exceedingly simple and efficient and consists of the retainer 20, which is a substantially U-shaped stamping (see Figs. 2 and 4), which passes over the rear bar truss 4 and is provided at its ends with aligned orifices. Another member, U-shaped in side elevation as shown at 21 but provided with top and bottom ears 22, is provided, and the U-shaped member 20 has one leg thereof extending through the top and bottom portions of the member 21, as clearly illustrated in Fig. 4, whereby the rear bar truss is positioned between the front face of the member 21 and the rear face of one leg of the member 20. A bolt 30 is thereafter passed through the orifices of the respective legs of the member 20 and a clamping connection is thereby effected to rigidly affix the member 21 to the rear bar truss. The member 21 is provided with orifices 31 therein to permit attachment to the vehicle.

From the foregoing it will be readily apparent that we have provided an exceedingly simple bumper of correct mechanical design to effect a maximum resistance with a minimum of parts and wherein the manufacture and assembling thereof is greatly facilitated, thereby making the bumper, while efficient, economical of manufacture and sale.

It will be further seen that we have provided a bumper wherein the various assembly parts are of simplified construction and novel design. As previously stated, many modifications and changes in details will readily occur to those skilled in the art without departing from the spirit and scope of our invention as defined in the claims, and as previously stated we therefore desire to have the drawings and specification regarded in an illustrative sense rather than in a limiting sense, but having now set forth the objects and the nature of our invention and having shown and described a structure embodying the principles thereof, what we claim as new and useful and of our own invention, and desire to secure by Letters Patent, is:

1. In a bumper structure, the combination with a front bar and a rear bar truss formed with a curve therein and carried thereby, supporting connections between the ends of said bars, said supporting connections including means for permitting longitudinal traverse of one of said bars relative to the other upon impact on said front bar, the said traverse being limited only by the curved bar truss becoming straight.

2. In a bumper structure, the combination with a front bar and a rear bar truss formed with a curve therein, means for supporting said bar and said rear bar truss with respect to each other whereby the ends of said truss are slidably carried by the ends of said bar, and means for permitting a sliding elongation of said truss relative to said bar upon impact on said bar, the extent of elongation being limited only by the curved bar truss becoming straight.

3. In a bumper structure, the combination with a front bar, of a rear bar truss formed with a curve therein, means for slidably supporting said bars with respect to each other, the relative movement of said bars being limited only by the curved truss bar becoming straight.

4. In a bumper structure, the combination with a front bar, of a rear bar truss formed with a curve therein, means for slidably supporting said bars with respect to each other, the relative movement of said bars being limited only by the curved truss bar becoming straight and normally opposed by the curved rear bar truss.

5. In a bumper structure, the combination with a front bar, of a rear bar truss formed with a curve therein, means for slidably supporting said bars with respect to each other, the relative movement of said bars being limited only by the curved truss bar becoming straight supporting means normally imposing a tension on said rear bar truss.

6. In a bumper structure, the combination with a front bar, of a rear bar truss formed with a plurality of curves therein of substantially the same radius, alternate curvatures being opposite in direction, and means for supporting said truss by said bar whereby substantial longitudinal traverse of said truss relative to said bar is permitted.

7. In a bumper structure, the combination with a front bar, of a rear bar truss formed with a plurality of curves therein of substantially the same radius, alternate curvatures being opposite in direction, and means for supporting the ends of said truss by said bar whereby substantial longitudinal traverse of the ends of said truss relative to said bar is permitted.

8. In a bumper structure, the combination with a front bar, of a rear bar truss formed with a plurality of curves therein of substantially the same radius, alternate curvatures being opposite in direction, and means for supporting the said truss in contact with said bar at the ends and approximate center of said truss, and means for permitting substantial longitudinal traverse of said truss relative to said bar.

9. In a bumper structure, the combination with a front bar, of a rear bar truss formed with a plurality of curves therein of substantially the same radius, alternate curvatures being opposite in direction, means for supporting the said truss in contact with said bar at the ends and approximate center of said bar, and means for permitting substantial longitudinal traverse of said truss relative to said bar.

10. In a bumper structure, the combination with a front bar and a curved rear bar truss carried thereby, supporting connections between the ends of said bars, said supporting connections including means for permitting longitudinal traverse of one of said bars relative to the other upon impact on said front bar, the said traverse being limited only by the curved bar truss becoming straight, and means carried by said rear bar truss for attaching the bumper to a vehicle.

11. In a bumper structure, the combination with a front bar and a rear bar truss formed with a curve therein, means for supporting said bar and said rear bar truss with respect to each other whereby the ends of said truss are slidably carried by the ends of said bar, means for permitting a sliding elongation of said truss relative to said bar upon impact on said bar, the extent of elongation being limited only by the curved bar truss becoming straight, and means carried by said rear bar truss for attaching the bumper to a vehicle.

12. In a bumper structure, the combination with a front bar, of a rear bar truss formed with a curve therein, means for slidably supporting said bars with respect to each other, the relative movement of said bars being limited only by the curved truss bar becoming straight, and means carried by said rear bar truss for attaching the bumper to a vehicle.

13. In a bumper structure, the combination with a front bar, of a rear bar truss formed with a curve therein, means for slidably supporting said bars with respect to each other, the relative movement of said bars being limited only by the curved truss bar becoming straight and normally opposed by the curved rear bar truss, and means carried by said rear bar truss for attaching the bumper to a vehicle.

14. In a bumper structure, the combination with a front bar, of a rear bar truss formed with a curve therein, means for slidably supporting said bars with respect to each other, the relative movement of said bars being limited only by the said curved bar truss becoming straight, said supporting means normally imposing a tension on said rear bar truss, and means carried by said rear bar truss for attaching the bumper to a vehicle.

15. In a bumper structure, the combination with a front bar, of a rear bar truss formed with a plurality of curves therein of substantially the same radius, alternate curvatures being opposite in direction, means for supporting said truss by said bar whereby substantial longitudinal traverse of said truss relative to said bar is permitted, and means carried by said truss for attaching the bumper to a vehicle.

16. In a bumper structure, the combination with a front bar, of a rear bar truss formed with a plurality of curves therein of substantially the same radius, alternate curvatures being opposite in direction, means for supporting the ends of said truss by said bar whereby substantial longitudinal traverse of the ends of said truss relative to said bar is permitted, and means carried by said truss for attaching the bumper to a vehicle.

17. In a bumper structure, the combination with a front bar, of a rear bar truss formed with a plurality of curves therein of substantially the same radius, alternate curvatures being opposite in direction, means for supporting the said truss in contact with said bar at the ends and approximate center of said truss, means for permitting substantial longitudinal traverse of said truss relative to said bar, and means carried by said truss for attaching the bumper to a vehicle.

18. In a bumper structure, the combination with a front bar, of a rear bar truss formed with a plurality of curves therein of substantially the same radius, alternate curvatures being opposite in direction, means for supporting the said truss in contact with said bar at the ends and approximate center of said bar, means for permitting substantial longitudinal traverse of said truss relative to said bar, and means carried by said truss for attaching the bumper to a vehicle.

19. In a bumper structure, the combination with a front bar, and a rear bar truss carried thereby, means for permitting substantial longitudinal traverse of said truss relative to said bar upon impact on said bar, and interlocking metal stampings clamped to said truss and to each other for forming means of attachment of the bumper to a vehicle.

20. In a bumper structure, the combination with a front bar, of a rear bar truss of spring steel curved with respect thereto, and means for supporting said rear bar truss in contact with said front bar to permit the straightening of said truss relative to said bar when pressure is exerted on said bar, said straightening being limited only by the extent of curvature of said truss.

21. In a bumper structure, the combination with a front bar, of a rear bar truss of spring steel curved with respect thereto, and means for supporting said rear bar truss in contact with said front bar to permit relative movement between said truss and bar when pressure is exerted on said bar, said movement being limited only by the extent of curvature of said truss.

22. In a bumper structure, the combination with a front bar and a rear bar truss normally carried under tension thereby and permitting substantial longitudinal traverse of said truss relative to said bar upon impact on said bar.

23. In a bumper structure, the combination with a spring steel front bar and a spring steel bar truss, normally carried under tension thereby and permitting substantial longitudinal traverse of said truss relative to said bar upon impact on said bar.

In testimony whereof we have hereunto set our hand on this 30th day of April, A. D. 1923.

EMIL PROMEN.
WM. N. PROMEN.